United States Patent [19]

Iriarte

[11] 4,064,932
[45] Dec. 27, 1977

[54] ALL CLIMATE HEAT EXCHANGER UNIT WITH ADJUSTABLE TEMPERATURE AND DEFROST CONTROL

[75] Inventor: Wilfrido R. Iriarte, Long Beach, Calif.

[73] Assignee: Hughes Aircraft Company, Culver City, Calif.

[21] Appl. No.: 768,457

[22] Filed: Feb. 14, 1977

[51] Int. Cl.[2] .............................................. F28D 15/00
[52] U.S. Cl. ........................................ 165/1; 165/86; 165/103; 165/105; 165/DIG. 12
[58] Field of Search ...................... 165/105, 96, 1, 103, 165/86, DIG. 12

[56] References Cited

U.S. PATENT DOCUMENTS

| 3,788,388 | 1/1974 | Barbmann | 165/105 X |
| 3,980,129 | 9/1976 | Bergdahl | 165/66 X |

FOREIGN PATENT DOCUMENTS

| 495,929 | 9/1953 | Canada | 165/105 |

*Primary Examiner*—Albert W. Davis, Jr.

*Attorney, Agent, or Firm*—Lewis B. Sternfels; W. H. MacAllister

[57] ABSTRACT

A plurality of parallel heat pipes extends between supply and exhaust ducts leading to and from an industrial or habitable enclosure. The heat pipes are mounted on, but at a fixed angular offset from, an axis about which they can be angularly rotated within the exhaust and supply ducts. Their mounting is also at an angular inclination to gravitational force to assure unidirectional operation. In this arrangement, the heat input is into the lower side of the heat pipes for proper operation. For two-season operation, rotation of the heat pipes by 180° ensures that the lower side of the heat pipes will always be in the warmer duct, whether exhaust or supply. Temperature control of incoming air is obtained by slight angular rotation of the heat pipes so that a part of each air stream in the exhaust and supply ducts bypasses the heat pipes. Defrost control is also obtained by a similar slight angular rotation of the heat exchanger, although a complete 180° turn is possible; however, with the unidirectional nature of the unit, after defrosting, the unit must be turned back 180° to its original position. Complete bypass is obtained by a 90° turn.

13 Claims, 7 Drawing Figures

ALL CLIMATE HEAT EXCHANGER UNIT WITH ADJUSTABLE TEMPERATURE AND DEFROST CONTROL

BACKGROUND OF THE INVENTION

1. Field of the Invention

The present invention relates to a heat pipe heat recovery unit for unidirectional, but reversible, and temperature controllable transfer of heat between at least two ducts.

2. Description of the Prior Art

The ever-increasing need to conserve energy resources in industrial and habitable environments has generated a large number of possible solutions. Such solutions generally involve the transfer of heat between exhaust and supply ducts in which the warmer fluid of one duct is extracted by means of heat pipes transferred to the fluid flowing through the other duct.

Two concepts advanced in recent years are described in the U.S. Pat. Nos. 3,788,388 and 3,980,129. The latter patent is concerned with reducing frost build-up at the exit end of the exhaust-duct heat exchanger. The heat pipes are disposed horizontally within the heat exchanger which is rotated about an axis so that, when ice forms at the end of the warm air exhaust nearest the cold outside environment, the heat exchanger may be turned to 180° about its axis so that warm exhaust air impinges directly on the frosted heat pipes. In U.S. Pat. No. 3,788,388 heat transfer between ducts is bi-directional which is claimed to occur as a result of the liquid phase of the working fluid being normally free-standing along substantially the entire length of the heat pipes, with a substantial vapor space also substantially along the entire length of the heat pipes. Tilt is induced solely to limit the amount of heat transferred from the air stream in one duct to the air stream in the other duct by reducing the effective length of the heat pipes and, therefore, the overall efficiency of the thermal transfer unit.

SUMMARY OF THE INVENTION

The present invention presents an entirely different solution to the heat recovery problem by improving upon the prior art. It comprises a heat exchanger whose heat pipes are in and thermally coupling at least two ducts so that the fluid in the ducts flows through the heat pipes. The heat pipes are angularly movable about an axis extending through and normal to the ducts, with the important conditions that the heat pipes have a fixed angular offset from the axis about which they rotate. In addition, to operate at higher capacity, the heat pipes are inclined at an angle to a line normal to gravitational force in order to take advantage of gravity to return the working fluid to its evaporator end. Therefore, the heat input must be into the lower side of the heat pipes for proper operation.

When these heat exchangers are used in installations where all-climate operation is required, a simple reorientation of the inclination to gravity is effected by moving the heat pipes angularly about their axis. Therefore, the invention permits orientation of the heat exchanger so that it can be operated in either heating (winter) or cooling (summer) conditions by 180° turn of the unit. Precise temperature control as well as defrost control is made by slight angular rotation of the heat exchanger unit such that a part of each air stream may be bypassed.

Defrost control is also possible by a complete 180° rotation, as in above-noted U.S. Pat. No. 3,980,129; however, it is required that the heat pipes be turned another 180° to continue proper heat transfer, as a result of their angular inclination to gravity. Also as in U.S. Pat. No. 3,980,129, by rotating the heat exchanger to 90°, a complete bypass is obtained so that no heat will be transferred.

It is, therefore, an object of the present invention to provide for a novel construction and use of a heat recovery unit.

Another object is to provide for temperature control between two air streams.

Another object is to provide for an all-climate operation with heat recovery.

Another object is to provide for defrost of portions of the heat recovery unit.

Another object is to provide for complete inactivation of the unit.

Other aims and objects as well as a more complete understanding of the present invention will appear from the following explanation of exemplary embodiments and the accompanying drawings thereof.

DESCRIPTION OF THE PREFERRED EMBODIMENTS

Figure 1:
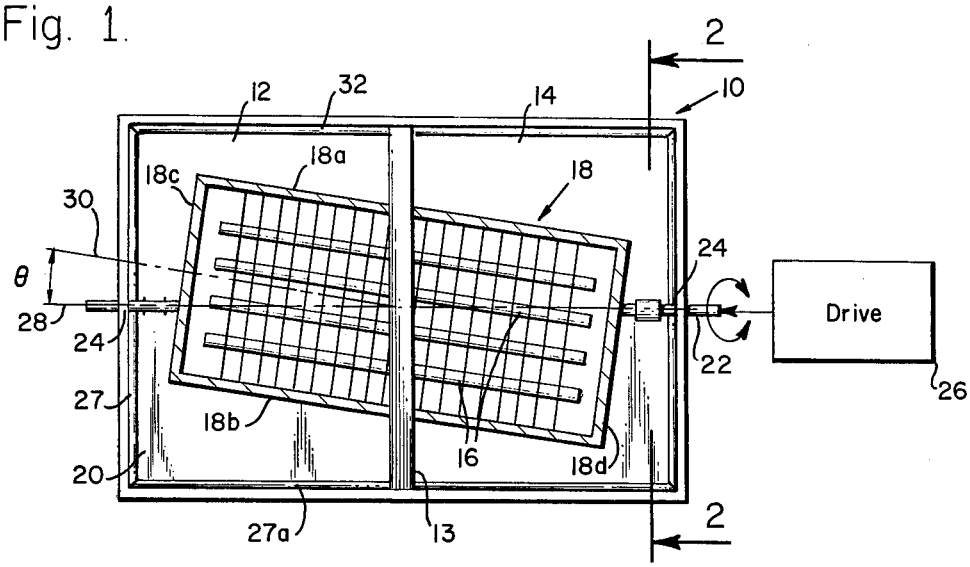
FIG. 1 is a cross-sectional view of a pair of ducts showing a first embodiment of the present invention.
Figure 2:
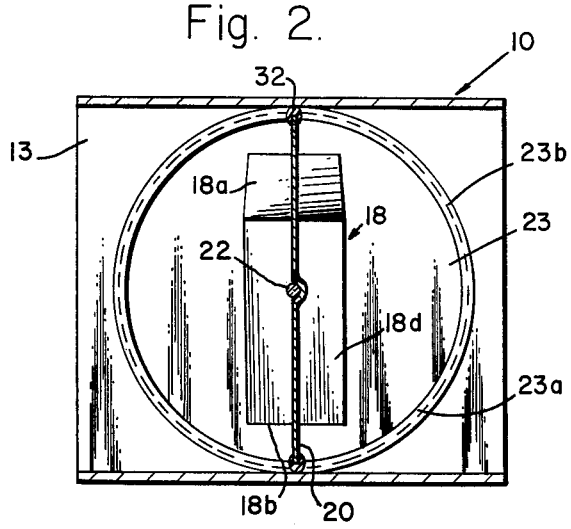
FIG. 2 is a cross-sectional view of the embodiment depicted in FIG. 1 taken along lines 2—2 thereof.
Figure 4:
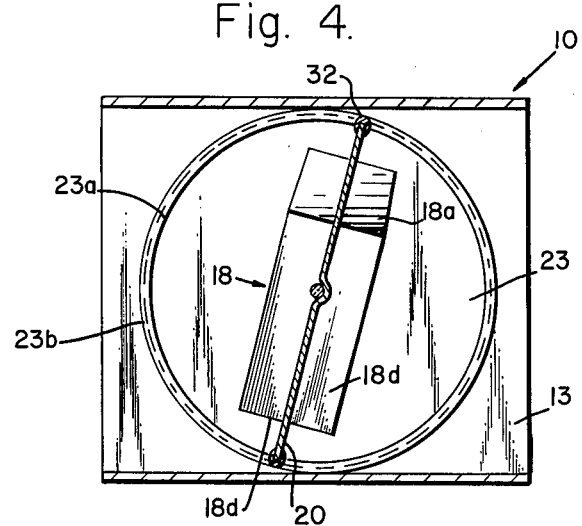
FIG. 4 is another view similar to FIG. 2 showing a slight angular movement of the heat recovery unit.

Referring now to FIGS. 1 and 2, a ducting system includes a portion 10 which comprises a first duct 12 separated by a divider wall 13 from a second duct 14 through which, for example, supply air and exhaust air respectively flow. The ducting system may be secured to a habitable enclosure or industrial process. Extending between the two ducts are a plurality of heat pipes 16 which are formed in any manner known in the art. Heat pipes 16 are secured in conventional manners to a four sided, generally rectangular frame 18 whose opposed sides 18a, 18b and 18c, 18d respectively extend generally parallel and normal to heat pipes 16, so that the frame is open to the supply fluid in duct 12 and the exhaust fluid in duct 14. The heat pipes and their frame 18 are mounted on a plate 20. Frame 20 is pivoted on shafts 22 or equivalent which are journalled in suitable bearings at 24 of ducts 14 and in a large circular bearing 23 in divider wall 13. Shafts 22 are adapted to be angularly driven or moved by any suitable means 26 which is generally labelled "rotational or angular drive". Conventional seals 23b and 32 extend about the peripheries 23a and 27 of frame 18 and bearing 23 to ensure proper fluid sealing to the ducts and wall 13.

Figure 3:
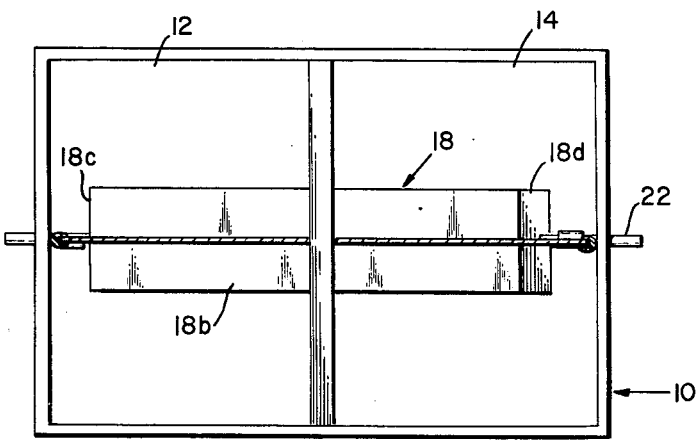
FIG. 3 is another view similar to that shown in FIG. 1 but with the heat recovery unit turned 90° to that in the preceding figure.

Heat pipes 16 are operated at an angle $\theta$ of inclination to gravity. For heat ventilating and air conditioning of habitable enclosures, angle $\theta$ is preferably of at least 6°. For industrial or high temperature application, a larger angle $\theta$, for example 10° or greater, is preferred. In any case, the angle is dependent upon the requirements of the use in which the heat recovery unit is placed. Since shafts 22 and large bearing 23 are generally placed on a line which is normal to the direction of gravitational force, axis 28 of shafts 22 and bearing 23 therefore define such a normal to the direction of gravity. Therefore, as shown in FIG. 1, axis 30 of the heat pipes is also at angle $\theta$ from the axis about which plate 20 rotates. The angular disposition between axes 28 and 30 is fixed or permanent; however, because supporting plate 20 and angularly offset frame 18 and heat pipes 16 rotate about axis 28, at 90°, the angle between the heat pipes axis 30 and a plane which is normal to the direction of gravity will be zero. It is intended, however, that heat pipes 16 not be operational when in the 90° position, that is, 90° with respect to that shown in FIG. 1 and as shown in FIG. 3.

This particular inclination angle $\theta$ of heat pipes 16 with respect to gravity permits gravity to be utilized for the return of the working fluid from the point where it condenses to the point where it evaporates. In this arrangement, the heat input must be into the lower side of the heat pipes for proper operation thereof. In addition, such an angle of inclination to gravity ensures that the heat pipes operate in a single direction, that is, with unidirectional heat transfer.

Therefore, as shown in FIGS. 1 and 2, the fluid passing through duct 14 is of higher temperature than that flowing through duct 12 so that heat transfer is from duct 14 to duct 12. Because duct 14 has been designated as an exhaust duct, the configuration shown in FIGS. 1 and 2 show an operation of the invention during winter in which the hot or warmer air from the inhabitable enclosure is transferred to incoming cold air passing through supply duct 12 in order to preheat it and accordingly to conserve thermal energy.

If it should occur that the amount of heating is too great for the particular position shown, rotational or angular drive 26 may rotate the unit a few degrees so that a part of the fluid streams passing through both ducts 12 and 14 will escape over the edges and past seals 32 at edges 27a of plate 20 which otherwise prevent any air from escaping around the frame. This slight angular rotation decreases the efficiency of heat transfer so that less than the full amount of the heat capable of being transferred from exhaust duct 14 to supply duct 12 occurs. Thus, by varying the angle of inclination, a greater or lesser amount of heat can be controlled so as to obtain a precise temperature control thereof.

Furthermore, in extreme cold where supply air will conduct sufficient heat away from the far end of the heat pipes in exhaust duct 14, those heat pipes furthest spaced from the habitable enslosure will become frosted and prevent proper operation of the heat recovery unit such as described in above-noted U.S. Pat. No. 3,980,129. To remove the frost, it is only necessary to slightly rotate the heat recovery unit in order to reduce the efficiency of thermal transfer of heat. The frost will therefore melt and be removed and, thereafter, the heat recovery unit may be returned to its normal angular rotation for maximum control. It is possible, of course, to fully rotate the unit 180°, as suggested by U.S. Pat. No. 3,980,129; however, after the frost is removed, and not like that taught by that patent, the heat recovery unit will have to be rotated another 180° back to its original position in order for it to operate.

Figure 5:
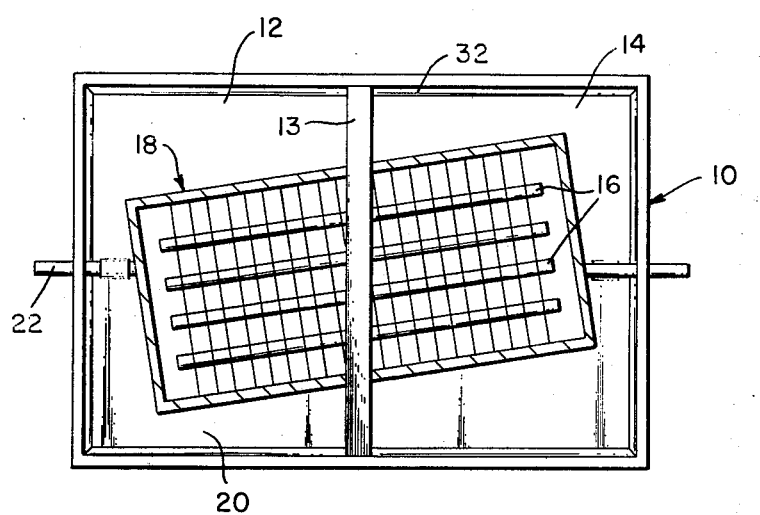
FIG. 5 is a view similar to that shown in FIGS. 1 and 2 but turned 180° from that illustrated.

Such 180° rotation, which was suggested above for purposes of defrost control, is used herein primarily for summer operation of the invention, that is, as shown in FIG. 5 in which the lower side of the heat recovery unit is now in supply duct 12 so that the cooler air exhausting through duct 14 from the inhabitable enclosure will cool the incoming air passing through duct 12. This is particularly effective if air conditioning or equivalent equipment is utilized. Rather than simply exhausting the cold air to the external environment and wasting the energy used in cooling such air, this cooler air is used to draw heat from air being supplied through duct 12. Therefore, a simple change from summer to winter operation, or vice versa, can be obtained simply by rotating the heat recovery unit by 180°.

Figure 6:
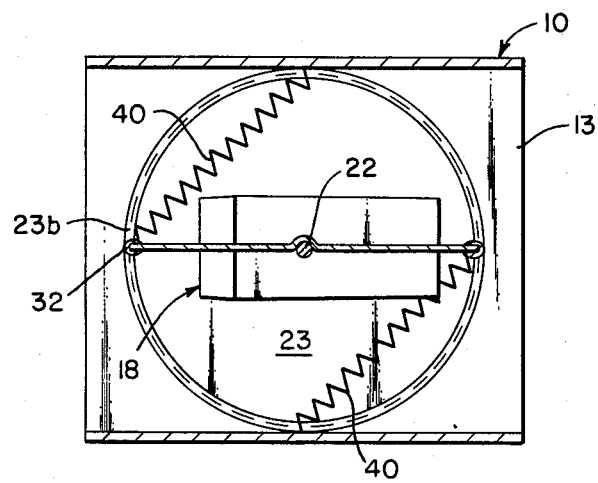
FIG. 6 illustrates a second modification of the invention showing accordian seals in one of the ducts.

If it is desired to completely bypass the heat recovery unit so that it will not operate to transfer heat in one direction or the other, it is rotated to a 90° position as shown in FIG. 3 so that air or other fluid medium is completely by-passed around the thermal recovery unit. In certain cases, this 90° rotation is required in some industrial uses where the environment to be controlled involves the use of high thermal energies in which there may be an excess of thermal energy. If such excess heat were allowed to exhaust onto heat pipes 16, it would destroy or seriously degrade them. In such a case, it would be necessary to turn the heat exchanger to a 90° position as shown in FIG. 3. In addition, as shown in FIG. 6, accordion pleated seals 40 may be attached to the heat pipes only in supply duct 12 so that there will be a certain amount of thermal conductivity by forcing air flow through only one side of the heat exchanger, that is, by drawing whatever heat might be placed on heat pipes 16 in exhaust duct 14. Thus, possible damage by extremely hot blasts through exhaust 14 on the heat pipes is reduced.

It is to be further understood that such an accordion seal may be similarly placed in the exhaust duct for such control as exclusive winter use for inhabitable structures.

Figure 7:
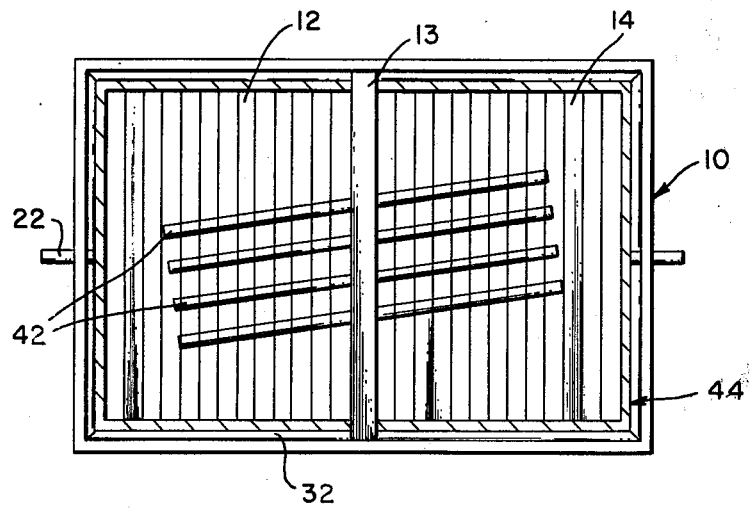
FIG. 7 illustrates a third embodiment of the present invention similar to that depicted in FIG. 1.

While the preferred arrangement of the invention is shown in FIGS. 1-5, the arrangement shown in FIG. 7 may be utilized in that heat pipes 42 may be secured directly to a frame 44. In this arrangement, frame 44 is a four-sided, generally rectangular frame, like frame 18 of FIGS. 1-5; however, heat pipes 42 are angled with respect to the frame sides in contradistinction to that previously described. The end result is the same in both cases, that is, heat pipes 42 are angled with respect to the axis of rotational shafts 22 and also at an angle of inclination with respect to gravity in its operational modes. Both configurations are operationally equivalent. The arrangement in FIGS. 1-5, however, is preferred solely from a manufacturing point of view, that is, it is simpler to manufacture a unit in which the heat pipes are parallel or perpendicular to the sides of the frame which is mounted in an offset manner on a plate, rather than to manufacture such an arrangement where the heat pipes are angled with respect to the frame. The primary difficulties in the manufacturing of the two relate to the fins which are generally placed about the heat pipes to increase the thermal contact of the fluids passing through the heat pipes. In FIGS. 1-5, all the fins can be the same with the same holes placed therein. In FIG. 7, a whole series of separate type fins with differently placed holes are necessary.

In this respect, it is also to be acknowledged that the preferred shape of the heat recovery unit is rectangular both in its frontal view, as shown in FIG. 1, as well as in the side view, as shown in FIGS. 2 and 3. This permits maximum use of the invention. It is to be understood, however, that the heat pipes may be formed in a frame having a square or circular configuration, or a configuration which is polygonal or elliptical and possibly being better suited to the special requirements of heat recovery. However, such shapes other than that disclosed and shown in the accompanying drawings may not make it possible to obtain a complete bypass position and may also produce problems in obtaining even flow of fluid through all of the heat pipes, in particular, the centrally placed heat pipes.

Although the invention has been described with reference to particular embodiments thereof, it should be realized that various changes and modifications may be made therein without departing from the spirit and scope of the invention.

What is claimed is:

1. A heat exchanger including heat pipes in and thermally coupling at least two ducts and positioned in the path of fluid flows therethrough, in which said heat pipes are angularly moveable about an axis extending through and normal to said ducts, characterized in that said heat pipes have a fixed angular offset from the axis and an angular inclination with respect to gravity for unidirectional transfer of thermal energy between said ducts.

2. The heat exchanger of claim 1 further characterized in that a driving mechanism is secured to said heat pipes for imparting angular movements thereto about the axis thereby for controlling the amount and direction of the unidirectional transfer of thermal energy between said ducts.

3. The heat exchanger of claim 2 further characterized in that said heat pipes are secured substantially in parallel within a four-sided, generally rectangular frame whose opposed sides respectively extend generally parallel and normal to said heat pipes, said frame being open within said sides for permitting the fluid flows around and between said heat pipes.

4. The heat exchanger of claim 3 further characterized in that said frame is secured to a divider plate having a peripheral shape closely matched to that of the inside of said ducts, with fluid seals at the plate periphery, and that journals are coaxially positioned on the axis and rotatably secure said plate and said ducts together, for enabling the fluid flows around and between said heat pipes at one angular position of said heat pipes when said fluid seals completely contact said ducts, and for enabling the fluid flows at least partially around said plate periphery at other angular positions of said heat pipes when said fluid seals do not completely contact said ducts.

5. The heat exchanger of claim 2 further characterized in that said heat pipes are secured substantially in parallel but at the fixed angular offset within a four-sided, generally rectangular frame which fits closely at its periphery within said ducts and whose opposed sides extend generally parallel and normal to the axis, said frame being open within said sides for permitting the fluid flows around and between said heat pipes and having fluid seals at said frame periphery, and that journals are coaxially positioned on the axis and between said frame and said ducts, for enabling the fluid flows around and between said heat pipes at one angular position of said heat pipes when said fluid seals completely contact said ducts, and for enabling the fluid flows at least partially around said plate periphery at other angular positions of said heat pipes when said fluid seals do not completely contact said ducts.

6. The heat exchanger of claim 2 in which said ducts supply and exhaust the fluids to an enclosure, further characterized in that an expandable seal is secured between opposed sides of an enclosure about said heat pipes and to opposed sides only one of said ducts.

7. A method of controlling the transfer of thermal energy in fluid flowing through at least two ducts which are thermally joined by a plurality of heat pipes which are angularly moveable about an axis normal to the direction of fluid flow, comprising the steps of angularly inclining the heat pipes with respect to gravity and the axis and angularly moving the heat pipes about the axis.

8. The method of claim 7 further comprising the step of slightly rotating the heat pipes about the axis and thereby causing the fluids to partly bypass the heat pipes for controlling the amount of the transfer of thermal energy and for removing any frost collected on the heat pipes.

9. The method of claim 7 further comprising the step of rotating the heat pipes 180° about the axis for reversing the transfer of thermal energy between the ducts.

10. The method of claim 7 further comprising the step of rotating the heat pipes 90° for discontinuing the transfer of thermal energy between the ducts.

11. The method of claim 7 further comprising the steps of rotating the heat pipes about the axis and impeding flow of a first of the fluids about the heat pipes in a first of the ducts for thereby causing a second of the fluids in a second of the ducts to bypass and heat pipes therein while forcing the first fluid around and between the heat pipes in the first duct for regulating the amount of thermal energy transferred by the heat pipes.

12. A heat exchanger including heat pipes in and thermally coupling at least two paths of fluid flows, in which said heat pipes are angularly movable about an axis, characterized in that said heat pipes have a fixed angular offset from the axis and an angular inclination with respect to gravity for unidirectional transfer of thermal energy between said fluid flow paths.

13. A method of controlling the transfer of thermal energy in fluid flowing in at least two streams which are thermally joined by a plurality of heat pipes which are angularly movable about an axis, comprising the steps of angularly inclining the heat pipes with respect to gravity and the axis and angularly moving the heat pipes about the axis.

* * * * *